United States Patent
Park et al.

(10) Patent No.: US 8,181,298 B2
(45) Date of Patent: May 22, 2012

(54) METHOD FOR CONTROLLING OF WASHER (75) Inventors: Seog Kyu Park, Changwon-si (KR); In Geun Ahn, Changwon-si (KR)

(73) Assignee: LG Electronics Inc., Seoul (KR)

( * ) Notice: Subject to any disclaimer, the term of this patent is extended or adjusted under 35 U.S.C. 154(b) by 753 days.

(21) Appl. No.: 11/629,322

(22) PCT Filed: Mar. 24, 2006

(86) PCT No.: PCT/KR2006/001079
§ 371 (c)(1),
(2), (4) Date: Apr. 28, 2008

(87) PCT Pub. No.: WO2006/101363
PCT Pub. Date: Sep. 28, 2006

(65) Prior Publication Data
US 2008/0271755 A1  Nov. 6, 2008

(30) Foreign Application Priority Data
Mar. 25, 2005 (KR) .................. 10-2005-0025056

(51) Int. Cl.
*B08B 7/04* (2006.01)
(52) U.S. Cl. ............. 8/149.3; 8/149.1; 8/149.2; 68/3 R; 68/5 C; 68/5 R (58) Field of Classification Search ............. 68/3 R, 68/5 R, 5 C, 222; 8/149.1, 149.2, 149.3
See application file for complete search history.

(56) References Cited

U.S. PATENT DOCUMENTS

| 2003/0061842 A1* | 4/2003 | Ryu et al. ............... 68/17 R |
| 2004/0187529 A1* | 9/2004 | Kim et al. ............... 68/207 |
| 2004/0237603 A1* | 12/2004 | Kim et al. ............... 68/15 |

FOREIGN PATENT DOCUMENTS

| CN | 1534128 A | 10/2004 |
| CN | 1537995 A | 10/2004 |
| CN | 1537996   | 10/2004 |
| EP | 1 469 120 A1 | 10/2004 |

* cited by examiner

*Primary Examiner* — Michael Barr
*Assistant Examiner* — Benjamin Osterhout
(74) *Attorney, Agent, or Firm* — McKenna Long & Aldridge LLP (57) ABSTRACT

A novel washing method that is capable of smoothly washing laundry with low washing water consumption and low power consumption is disclosed. The control method is applied to a washing machine having a steam generation unit. The control method comprising a step of discharging water out of the steam generation unit when a rinsing operation of the washing machine is carried out.

9 Claims, 5 Drawing Sheets

[Fig. 1]

PRIOR ART

[Fig. 2]

PRIOR ART

PRIOR ART

[Fig. 4]

| course | water supply valve | washing | rinsing 1 | rinsing 2 | rinsing 3 |
|---|---|---|---|---|---|
| steam washing | water supply to tub | on | on | on | on |
| | water supply to SG | on | on | on | on |
| normal washing | water supply to tub | on | on | on | on |
| | water supply to SG | on | off | off | off |

METHOD FOR CONTROLLING OF WASHER

This application claims priority to International application No. PCT/KR2006/001079 filed on Mar. 24, 2006 and Korean Application No. 10-2005-0025056 filed on Mar. 25, 2005, all of which are incorporated by reference, as if fully set forth herein.

TECHNICAL FIELD

The present invention relates to an operation method of a washing machine, and more particularly, to a control method of a washing machine that is capable of washing a steam generation unit using washing water supplied into the steam generation unit at a water supply step for rinsing, thereby increasing the steam efficiency, and therefore, accomplishing an efficient washing operation.

BACKGROUND ART

Generally, washing machines are classified into a pulsator type washing machine, a drum of which is mounted in a vertical direction, and a drum type washing machine, the drum of which is mounted in a horizontal direction.

In the drum type washing machine, as the drum is mounted in the horizontal direction as described above, laundry received in the drum is washed by a lifting and dropping operation.

In the above-mentioned washing machine, however, even when a washing process is carried out to wash a small amount of laundry and even when a washing process is carried out to wash laundry having low contamination, a large amount of washing water is unnecessarily consumed. Furthermore, the washing process is carried out for the same period of time as a normal washing process, and therefore, the power consumption is also unnecessarily large.

Especially, it is more efficient to carry out a wetting process before the washing process is carried out since the washing performance is increased by the wetting process. However, the amount of the washing water consumed when the wetting process is carried out is very large. For this reason, the wetting process is omitted when the normal washing process is carried out, and therefore, the best washing performance is not accomplished.

In order to solve the above-mentioned problems, a washing machine having a steam generation unit for supplying steam into a drum during a washing process has been used.

Hereinafter, such a conventional washing machine having a steam generation unit will be described with reference to the accompanying drawings.

Figure 1:
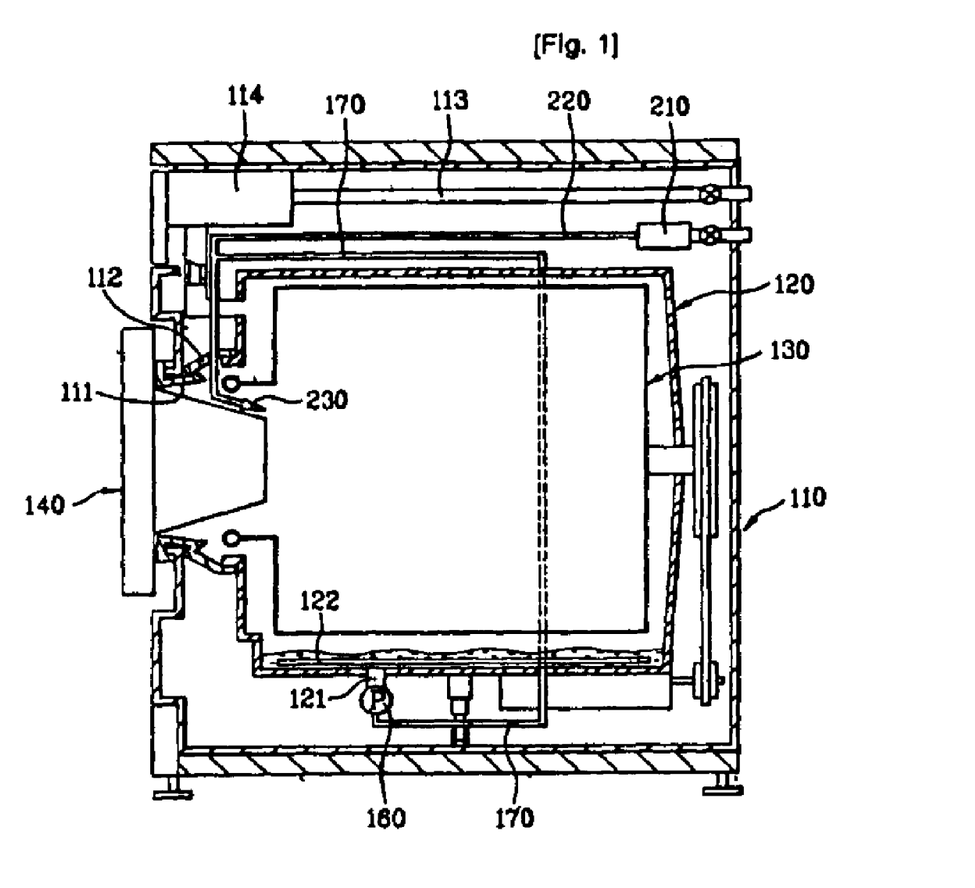
FIGS. 1 and 2 are a side sectional view and a front sectional view illustrating the interior structure of a washing machine having a steam generation unit, respectively.
Figure 2:
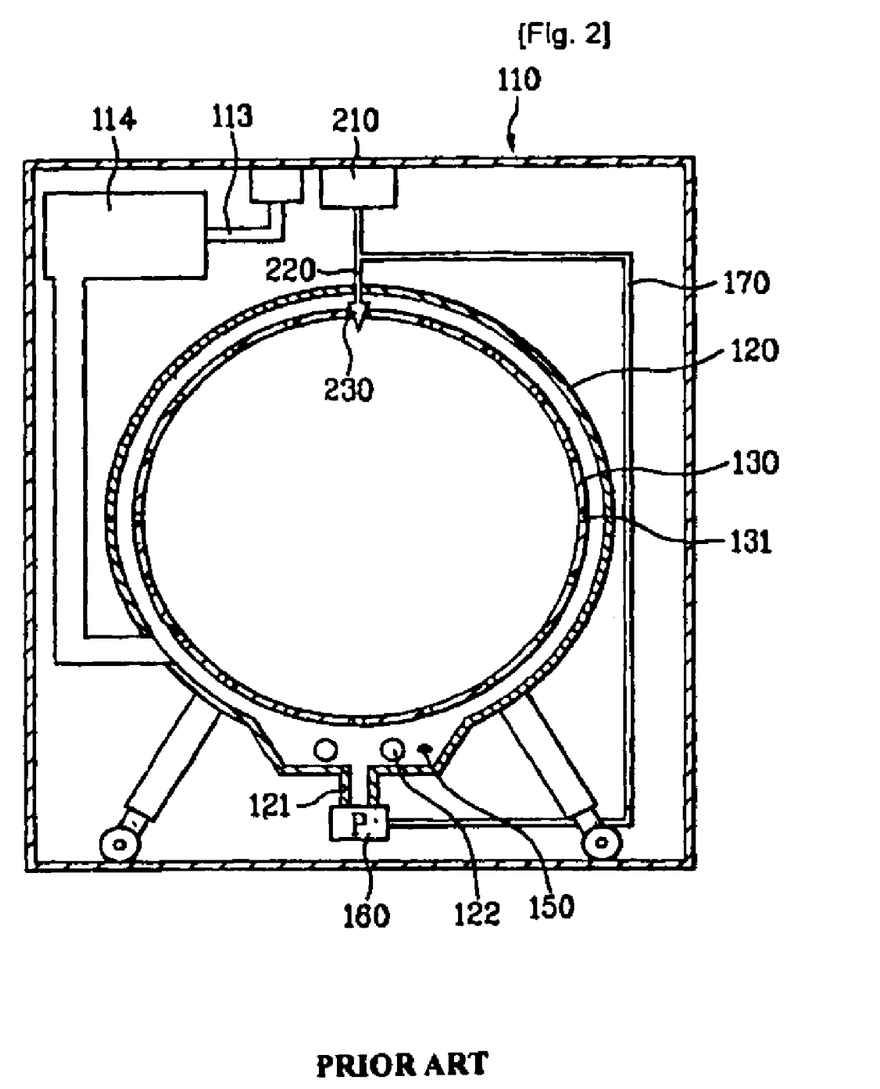

FIGS. 1 and 2 are a side sectional view and a front sectional view illustrating the inner structure of a washing machine having a steam generation unit, respectively.

The washing machine includes a machine case 110, a tub 120, a drum 130, a steam generation unit, a temperature sensor 150, a circulating pump 160, and a circulation channel 170.

The machine case 110 constitutes the external appearance of the drum type washing machine. At the front part of the machine case 110 is formed a laundry inlet hole 111.

A door 140 is mounted to the machine case 110 adjacent to the laundry inlet hole 111 for, opening and closing the laundry inlet hole 111. At the inner circumference of the laundry inlet hole 111 is mounted a rim part 112, which accomplishes sealing between the door 140 and the laundry inlet hole 111.

Also, a washing water supply pipe 113, which supplies washing water into the tub 120, is mounted in the machine case 110. On the pipe line of the washing water supply pipe 113 is mounted a detergent box 114.

The tub 120 is mounted in the machine case 110 in a supported state.

To the lower part of the tub 120 is connected a water drainage channel 121, through which washing water is drained.

Also, a washing water heater 122, which heats washing water supplied into the tub 120, is mounted in the lower part of the tub 120. The drum 130 is rotatably mounted in the tub 120, and is disposed such that the open side of the drum 130 is directed to the laundry inlet hole 111 of the machine case 110.

At the circumference of the drum 130 are formed a plurality of through-holes 131, through which washing water and steam supplied into the tub 120 are introduced into the drum 130.

The steam generation unit is mounted such that the steam generation unit can evaporate water using high-temperature hot air and supply steam generated from the water evaporation into the tub 120 and/or the drum 130. The steam generation unit includes a heating part 210 for generating high-temperature hot air to evaporate water, and a steam supply pipe 220, through which steam generated from the water evaporation by the heating part 210 flows.

Also, the steam generation unit further includes an injection nozzle 230 for injecting the steam flowing through the steam supply pipe 220 into the tub 120 and/or the drum 130.

Hereinafter, a steam washing operation will be described based on the detailed construction of the steam generation unit and a process of supplying water to the steam generation unit.

Figure 3:
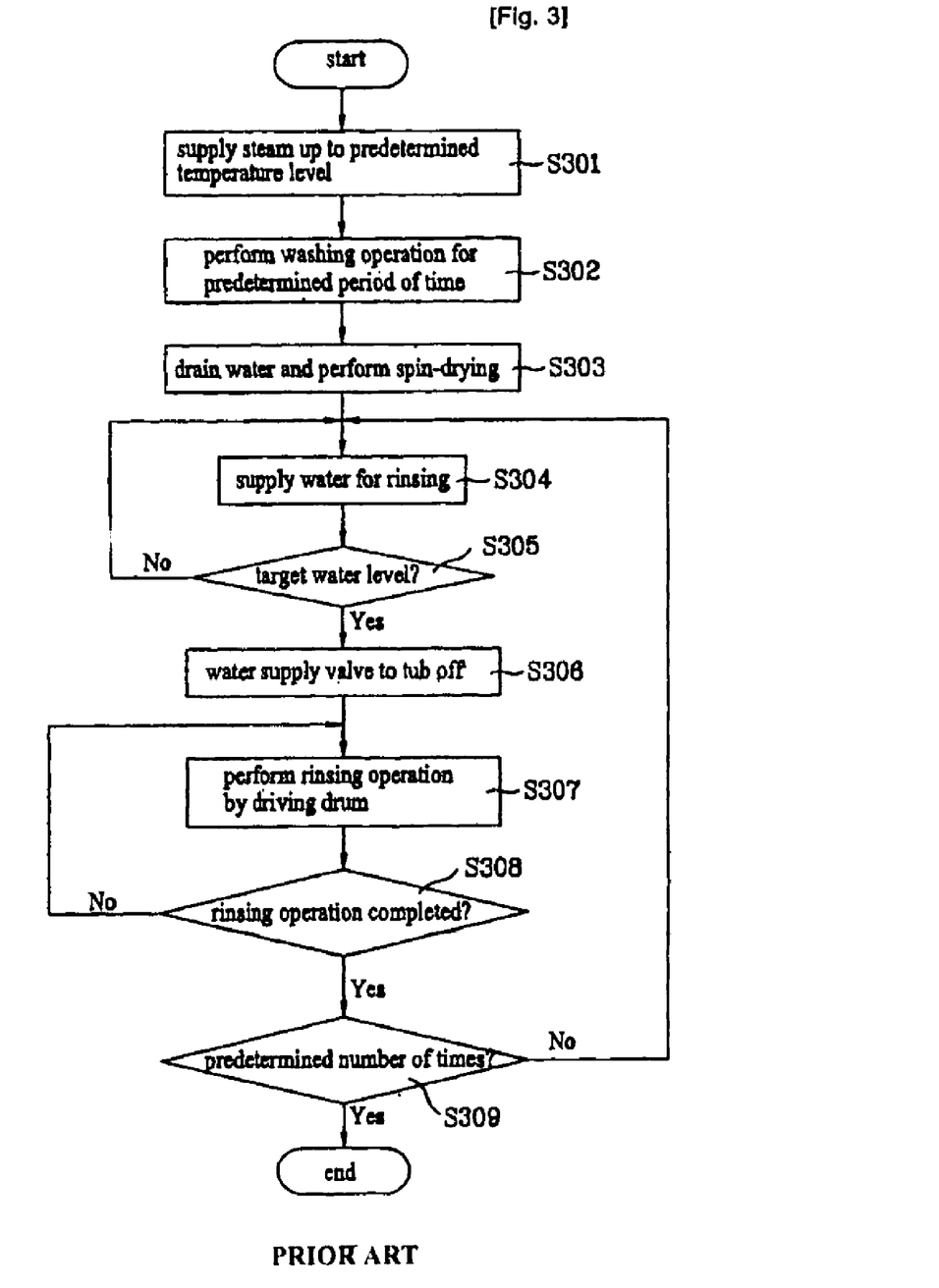
FIG. 3 is a flow chart illustrating a conventional steam washing operation.

FIG. 3 is a flow chart illustrating the conventional steam washing operation.

After initial water supply is completed, a heating step to generate steam is carried out, and the generated steam is supplied into the drum such that the interior temperature of the drum is increased to a predetermined temperature level (S301).

While the heating step to generate steam is carried out as described above, the circulation pump and the drum motor are driven on/off such that laundry can be uniformly wetted and the detergent can be uniformly applied to the laundry.

While the steam generated by the heating operation is supplied into the drum a step of detecting water level in the tub is carried out, and a step of determining whether water resupply is necessary or not is carried out based on the result of the water level detection. If necessary, the water resupply step is carried out.

When the interior temperature of the drum has reached a target temperature level while the heating step and the washing water circulating step are carried out, the heater of the steam generation unit is turned off, and the washing operation is carried out for a predetermined period of time (S302).

After the above-described washing operation is completed, the used washing water is drained, and a spin-drying operation is carried out (S303). After that, the supply of water to the tub for rinsing the washed laundry is initiated (S304).

Subsequently, the water supply is carried out until the water level in the tub reaches a target water level. After the water supply to the tub is completed (S305), the water supply valve to the tub is turned off (S306).

And a rinsing operation is carried out by the operation of the drum (S307). When the rising operation is completed (S308), it is determined whether the rinsing operation has been carried out for predetermined number of times (S309).

In this way, the water supply for rinsing and the rinsing operation are carried out for the predetermined number of times to remove contaminants, such as residua of the detergent, from the laundry.

The above-described conventional steam washing control method enables the laundry to be washed using steam whereby the laundry is washed in a small amount of washing water.

DISCLOSURE OF INVENTION

Technical Problem

However, the above-described conventional steam washing control method has the following problems.

While the high-temperature heating process is carried out to generate steam in the steam generation unit, calcic foreign matter may be generated. However, a control of the calcic foreign matter is not performed, and therefore, the washing efficiency is lowered.

Specifically, the foreign matter blocks the outlet nozzle of the steam generation unit, and therefore, the steam injection efficiency is lowered. In the case that a large amount of foreign matter is continuously accumulated, the heat transfer characteristic by the heating is deteriorated, and therefore, the steam generation efficiency is lowered.

The lowering of the steam injection and the steam generation in the steam generation unit makes it impossible to perform the washing operation with low washing water consumption and low power consumption. As a result, the washing quality is deteriorated.

Such deterioration of the washing quality greatly affects the reliability of the washing machine.

Technical Solution

Therefore, the present invention has been made in view of the above problems, and it is an object of the present invention to provide a control method of a washing machine that is capable of washing a steam generation unit using washing water supplied into the steam generation unit at a water supply step for rinsing during the operation of the washing machine, thereby increasing the steam efficiency, and therefore, accomplishing an efficient washing operation.

Additional advantages, objects, and features of the present invention will be set forth in part in the following description of preferred embodiments.

The object of the present invention can be achieved by providing a control method of a washing machine having a steam generation unit, the control method comprising the steps of: discharging water out of the steam generation unit when a rinsing operation of the washing machine is carried out.

The present invention is characterized in that the water in the steam generation unit overflows.

The present invention is characterized in that the water in the steam generation unit is discharged into a tub of the washing machine.

The present invention is characterized in that the water in the steam generation unit is discharged by a user's selection.

The present invention is characterized in that the water supply for rinsing and the water supply to the steam generation unit are simultaneously carried out to discharge the water out of the steam generation unit.

In another aspect of the present invention, provided herein is a control method of a washing machine, in which steam is supplied into a drum to perform a washing operation, the control method comprising the steps of: supplying steam into the drum by the heating operation of a steam generation unit such that the interior temperature of the drum is increased, whereby the washing operation is carried out, wherein, at a water supply step for rinsing after the steam washing operation is carried out, washing water passes through the steam generation unit, in the section where the washing water is supplied to a tub, such that the steam generation unit can be washed by the washing water passing through the steam generation unit.

The present invention is characterized in that, at the step of supplying the washing water into the steam generation unit such that the steam generation unit can be washed by the washing water supplied into the steam generation unit, the water having passed through the steam generation unit is supplied into the tub.

The present invention is also characterized in that the beginning point and the end point of the water supply into the steam generation unit are identical to the beginning point and the end point of the water supply into the tub.

The present invention is characterized in that, when the rinsing operation is repeatedly carried out, the washing water passes through the steam generation unit, such that the steam generation unit can be washed by the washing water passing through the steam generation unit, whenever the rinsing operation is carried out, irrespective of the number of rinsing processes.

The present invention is characterized in that, when a normal washing operation is carried out instead of the steam washing operation, the washing water does not pass through the steam generation unit during the rinsing operation after the washing operation is carried out.

Advantageous Effects

As apparent from the above description, the control method of the washing machine according to the present invention has the following effects.

While the washing water is supplied into the washing tub to perform the rinsing operation, the water is continuously supplied into the steam generation unit, such that the steam generation unit can be washed by the water supplied into the steam generation unit, irrespective of the water level detection. As a result, the accumulation of foreign matter is prevented, and therefore, the lowering of the steam generation and the steam injection is prevented.

Consequently, the present invention has the effect of performing the washing operation of the laundry with reduced washing water consumption and lower power consumption.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings.

Figure 4:
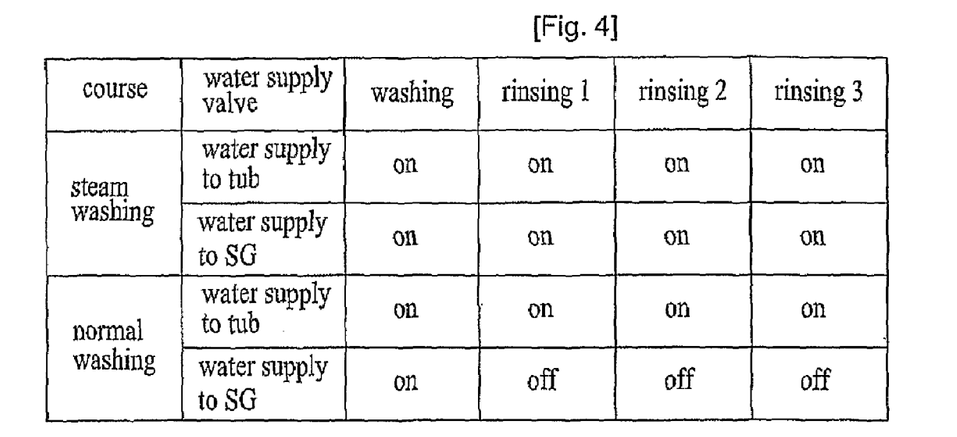
FIG. 4 is a table illustrating the operation of a water supply valve for each course during a steam washing operation according to the present invention.
Figure 5:
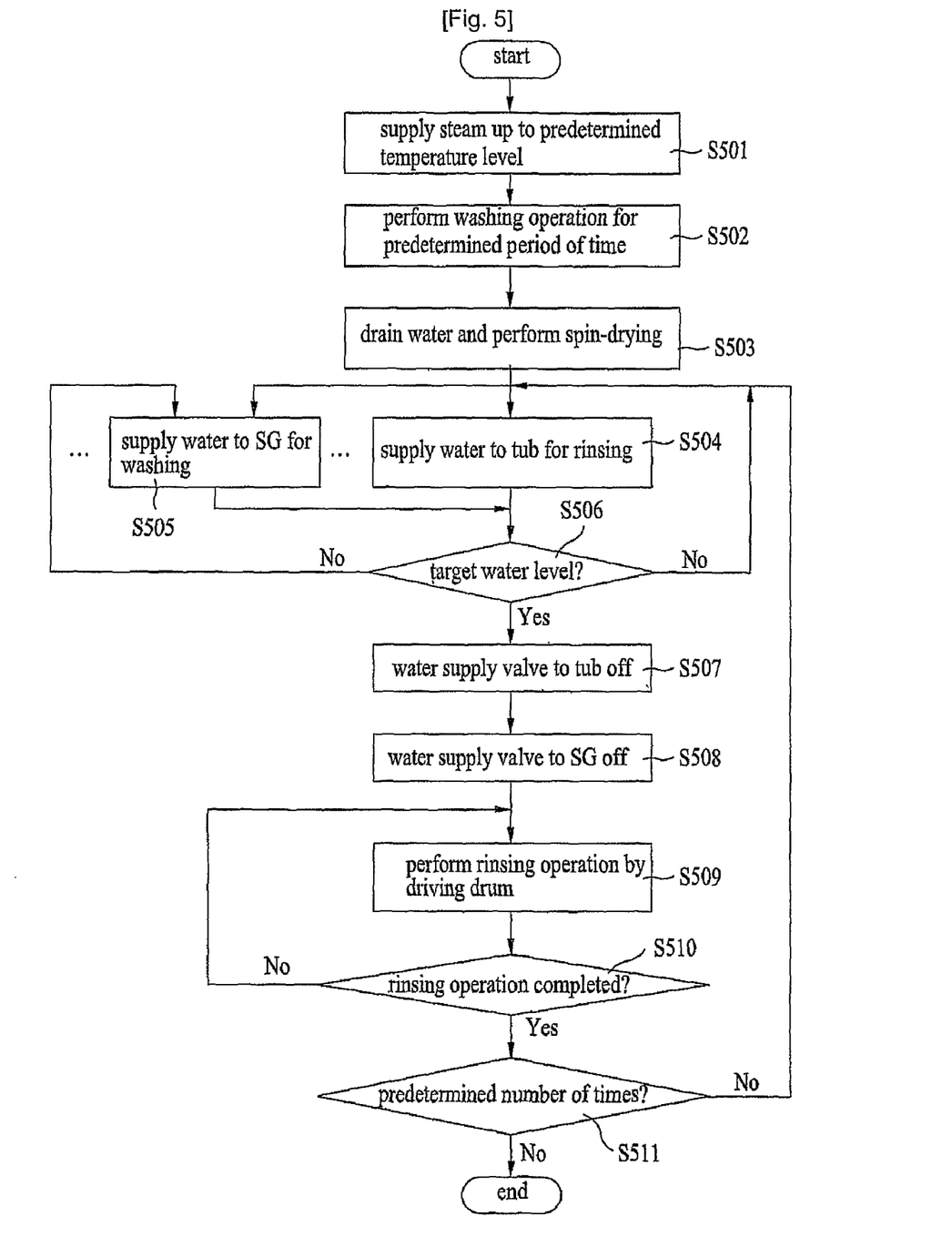
FIG. 5 is a flow chart illustrating a steam washing control method including a step of washing a steam generation unit according to the present invention.

FIG. 4 is a table illustrating the operation of a water supply valve for each course during a steam washing operation according to the present invention, and FIG. 5 is a flow chart illustrating a steam washing control method including a step of washing a steam generation unit according to the present invention.

At a water supply step for rinsing, the steam generation unit is washed by the washing water supplied into the steam generation unit, whereby the accumulation of foreign matter in the steam generation unit is prevented, and therefore, the steam efficiency is improved.

To this end, when the washing water is supplied into the tub for performing the rinsing operation, the washing water passes through the steam generation unit such that the steam generation unit can be washed by the washing water passing through the steam generation unit, and, subsequently, the washing water having passed through the steam generation unit is introduced into the tub.

Specifically, the control method according to the present invention includes a step of discharging water out of the steam generation unit when a rinsing operation of the washing machine is carried out. The water in the steam generation unit overflows due to water supply.

The step of washing the steam generation unit is carried out, until the supply of water to the tub is completed, such that the washing water passes through the steam generation unit, and therefore, foreign matter is discharged out of the steam generation unit.

The step of washing the steam generation unit according to the present invention is set by a user's selection. When the washing machine is frequently used, and therefore, it is determined that foreign matter is not accumulated in the steam generation unit, it is natural that the step of washing the steam generation unit may not be carried out during the rinsing operation.

When the outlet nozzle of the steam generation unit is blocked by foreign matter, and therefore, the steam washing operation is not possible, on the other hand, the water supply for washing the steam generation unit may be repeatedly carried out, while the heating of the steam generation unit (SG) is interrupted, irrespective of the water supply to the tub.

The operation of the washing machine according to the present invention begins with the supply of water to the tub and the steam generation unit. After the water is supplied to a predetermined water level, the water supply is interrupted.

While the heating operation to generate steam is carried out, the circulating pump is driven such that the detergent can be uniformly applied to the laundry and the consumption of the washing water is reduced, and, based on the result of the water level detection, the water resupply to the tub is carried out.

After the temperature reaches a predetermined temperature level by the heating operation, the washing operation is carried out for a predetermined period of time.

During the washing operation, the water resupply to the tub is carried out according to the water level detection, and, in the circulating pump driving section, the circulating pump is repeatedly driven for a predetermined number of times or for a pre-determined period of time.

After the washing operation is carried out for the predetermined period of time, a water draining operation, a spin-drying operation, and a rinsing operation are carried out.

During the rinsing operation, washing water is supplied to the tub, and, at the same time, the washing water passes through the steam generation unit, by which the steam generation unit is washed.

The present invention provides a more accurate steam washing control method that is capable of increasing the washing efficiency in such a new type steam washing operation.

As shown in FIG. 4, the washing operation according to the present invention is classified as a steam washing operation and a normal washing operation. In order to remove foreign matter generated in the steam generation unit during the steam washing operation, in which high-temperature heating is carried out, the water supply valve to the steam generation unit is turned on simultaneously when the water is supplied to the tub in the rinsing operation such that the steam generation unit can be washed by the supplied water.

In the case of the steam washing course, the water supply valve to the tub and the water supply valve to the steam generation unit are turned on whenever the washing operation and the rinsing operation are carried out. In the case of the normal washing course, on the other hand, only the water supply valve to the tub is turn on, and the water supply valve to the steam generation unit is turned off during the rinsing operation, since no heating is carried out in the steam generation unit.

First, as shown in FIG. 5, after initial water supply is completed, a heating step to generate steam is carried out, and the generated steam is supplied into the drum such that the interior temperature of the drum is increased to a predetermined temperature level (S501).

In the above-described water supply step for washing, it is determined whether the water level reaches a target water level using an output value of the tub water level sensor.

Here, the reference water level set to supply the washing water may be differently set depending upon the amount of the laundry, or may be equally set to the minion level, such that the washing water is saved, irrespective of the laundry amount.

The reference water level may be set such that the water level value which is referenced when the water is initially supplied is equal to the water level value which is referenced when the water is further supplied. Alternatively, the reference water level may be set such that the water level value which is referenced when the water is initially supplied is different from the water level value which is referenced when the water is further supplied.

When it is necessary to differently set the water level values, it is preferable to set the water level values such that the water level when the water is further supplied is less than the water level when the water is initially supplied, whereby the saving effect of the washing water is increased.

And the present invention is applied not only to an algorithm at which the water levels are set differently based on the detected amount of the laundry but also an algorithm at which the water levels are set equally to the minimum water level irrespective of the amount of the laundry.

While the heating step to generate steam is carried out as described above, the circulation pump and the drum motor are driven on/off such that laundry can be uniformly wetted and the detergent can be uniformly applied to the laundry.

While the steam generated by the heating operation is supplied into the drum a step of detecting water level in the tub is carried out, and a step of determining whether water resupply is necessary or not is carried out based on the result of the water level detection. If necessary, the water resupply step is carried out.

When the interior temperature of the drum has reached a target temperature level while the heating step and the washing water circulating step are carried out, the heater of the steam generation unit is turned off, and the washing operation is carried out for a predetermined period of time (S502).

After the washing operation is completed, the used washing water is drained, and a spin-drying operation is carried out (S503). After that, the supply of water to the tub for rinsing the washed laundry and the supply of water to the steam generation unit for washing the steam generation unit are initiated (S504, S505).

Subsequently, the water supply is carried out until the water level in the tub reaches a target water level. After the water supply is completed (S506), the water supply valve to the tub and the water supply valve to the steam generation unit are turned off (S507, S508).

And a rinsing operation is carried out by the operation of the drum (S509). When the rising operation is completed (S510), it is determined whether the rinsing operation has been carried out for predetermined number of times (S511).

In this way, the water supply for rinsing and the rinsing operation are carried out for the predetermined number of times to remove contaminants, such as residua of the detergent, from the laundry.

During the rinsing operation according to the present invention, the washing water is continuously supplied into the steam generation unit, such that the steam generation unit can be washed by the washing water supplied into the steam generation unit, and therefore, the foreign matter can be removed from the steam generation unit, until the supply of washing water to the tub is completed. The washing water supplied into the steam generation unit passes through the steam generation unit, and is then introduced into the washing tub.

In the control method of the washing machine with the above-stated construction according to the present invention, during the supply of water into the washing tub to carry out the rinsing operation after the steam washing operation is carried out, the water is continuously supplied into the steam generation unit such that the steam generation unit can be washed by the water supplied into the steam generation unit. Consequently, accumulation of foreign matter in the steam generation unit is effectively prevented.

It will be apparent to those skilled in the art that various modifications and variations can be made in the present invention without departing from the spirit or scope of the invention.

Thus, it is intended that the present invention cover the modifications and variations of this invention provided they cone within the scope of the appended claims and their equivalents.

INDUSTRIAL APPLICABILITY

The present invention provides an operation method of a washing machine. More particularly, the present invention provides a novel washing method that is capable of smoothly washing laundry with low washing water consumption and low power consumption.

The invention claimed is:

1. A control method of a washing machine to perform a steam washing course using steam and a normal washing course without steam, the control method comprising the steps of:
   performing the steam washing course in case that the steam washing course is selected, wherein the steam washing course includes:
      generating steam in a steam generator and supplying the steam into the drum until an interior temperature of the drum is increased to perform a steam washing operation; and
      passing water through the steam generator and into a tub when performing a rinsing operation after the steam washing operation is performed; and
   performing the normal washing course in case that the normal washing course is selected, wherein the normal course includes preventing water from entering the steam generator during a rinsing operation.

2. The control method according to claim 1, wherein, at the step of passing water through the steam generator includes passing water through the steam generator to wash an interior of the steam generator.

3. The control method according to claim 1, wherein the beginning time point and the end time point of a water supply into the steam generator are substantially identical to the beginning time point and the end time point of a water supply into the tub.

4. The control method according to claim 1, wherein, when the rinsing operation of the steam washing course is repeatedly carried out, the water passes through the steam generator, such that the steam generator is washed by the water passing through the steam generator, whenever the rinsing operation of the steam washing course is carried out, irrespective of the number of rinsing operations of the steam washing course.

5. A control method of a washing machine comprising the steps of:
   passing water through the steam generator and into a tub when performing a rinsing operation after a steam washing operation is performed, the steam washing operation is performed by generating steam in a steam generator and supply the steam into the drum; and
   preventing water from entering the steam generator during a rinsing operation when a normal washing operation is carried out instead of the steam washing operation, the normal washing operation is performed without generating and supplying steam.

6. The control method according to claim 5, further comprises
   simultaneously supplying water to the tub for rinsing after the steam washing operation and to the steam generator.

7. The control method according to claim 5, wherein, at the step of passing water through the steam generator includes passing water through the steam generator to wash an interior of the steam generator.

8. The control method according to claim 5, wherein the beginning time point and the end time point of a water supply into the steam generator are substantially identical to the beginning time point and the end time point of a water supply into the tub.

9. The control method according to claim 5, wherein, when the rinsing operation after the steam washing operation is repeatedly carried out, the water passes through the steam generator, such that the steam generator is washed by the water passing through the steam generator, whenever the rinsing operation after the steam washing operation is carried out, irrespective of the number of rinsing operations after the steam washing operation.

* * * * *